US006720361B2

(12) United States Patent
Tasaka et al.

(10) Patent No.: US 6,720,361 B2
(45) Date of Patent: Apr. 13, 2004

(54) FOAMABLE THERMOPLASTIC ELASTOMER COMPOSITION AND METHOD OF PRODUCING THE SAME

(75) Inventors: Michihisa Tasaka, Tokyo (JP); Hiroki Mizuno, Tokyo (JP)

(73) Assignee: Riken Technos Corp., Tokyo (JP)

( * ) Notice: Subject to any disclaimer, the term of this patent is extended or adjusted under 35 U.S.C. 154(b) by 0 days.

(21) Appl. No.: 10/183,948

(22) Filed: Jun. 28, 2002

(65) Prior Publication Data

US 2003/0027880 A1 Feb. 6, 2003

(30) Foreign Application Priority Data

Jun. 29, 2001 (JP) ........................... 2001-198892
Oct. 15, 2001 (JP) ........................... 2001-316542
May 24, 2002 (JP) ........................... 2002-149937

(51) Int. Cl.[7] .................. Q08J 9/22; Q08J 9/236; Q08J 9/32
(52) U.S. Cl. ................... 521/54; 521/134; 521/149; 521/150
(58) Field of Search ............... 521/54, 134, 149, 521/150

(56) References Cited

U.S. PATENT DOCUMENTS 5,260,343 A 11/1993 Harrison et al. ............. 521/51
6,127,444 A 10/2000 Kadri ........................ 521/139
6,316,509 B1 * 11/2001 Degerman

FOREIGN PATENT DOCUMENTS

EP 0 692 516 A1 7/1994

* cited by examiner

Primary Examiner—Morton Foelak
(74) Attorney, Agent, or Firm—Westerman, Hattori, Daniels & Adrian, LLP

(57) ABSTRACT

It is an object of the present invention to provide a foamable thermoplastic elastomer composition which produces a stable foam.

The present invention provides a foamable thermoplastic elastomer composition which contains: (a) 10 to 90 parts by weight of one of an olefin-based resin and rubber having a melting or softening point of 140° C. or lower, (b) 9 to 85 parts by weight of heat-expandable microcapsules expanding at 120 to 300° C., (c) 1 to 50 parts by weight of a volatile composition, wherein the components (a) to (c) total 100 parts by weight, and another aspect of the invention provides a foamable thermoplastic elastomer composition which contains; the above said (a) to (c) and (d) 50 to 99 parts by weight of a thermoplastic resin, wherein the components (a) to (d) total 100 parts by weight, and also provides a method of producing the above foamable thermoplastic elastomer composition in two stages.

12 Claims, No Drawings

FOAMABLE THERMOPLASTIC ELASTOMER COMPOSITION AND METHOD OF PRODUCING THE SAME

BACKGROUND OF THE INVENTION

1. Field of the Invention

This invention relates to a foamable thermoplastic elastomer composition and method of producing the same, more particularly to a foamable thermoplastic elastomer composition containing thermally expandable microcapsules and a method of producing the same.

2. Description of the Prior Art

Recently, resins have been foamed for improving their properties, e.g., heat insulation, sound insulation and shock absorption, and reducing their weight. The foamed resins are widely used for various purposes, e.g., gaskets for construction materials, floor materials, piping protection materials, shoe soles, door packings, sporting goods, grips, toys, vibration insulators, heat insulators, sound insulators and shock absorbers.

One method of producing the foamed resins includes a foaming agent in ethylene-α-olefin-based copolymer rubber to produce a thermoplastic hollow resin, as disclosed by Japanese Patent Laid-open Publication No. S59-1541. The method of foaming the above resin uses a foaming agent, e.g., nitroso, azo or urea compound. Use of these foaming agents, however, causes several problems, e.g., unstable foamed conditions, uneven size of the cells, and difficulty in continuously producing formed articles of foamed resins.

Japanese Patent Laid-open Publication No. S59-196328 discloses a rubber composition for foaming, composed of rubber or rubber elastomer incorporated with microcapsules, wherein the capsule shell of a thermoplastic resin contains core material which can expand the shell when heated. Moreover, Japanese Patent Laid-open Publication No. H4-246440 discloses a rubber composition composed of a rubber-like polymer incorporated with heat-expandable microcapsules starting to expand at 120° C. or higher, wherein the capsule shell of an acrylonitrile copolymer contains a low-boiling point hydrocarbon. Even these methods which use heat-expandable microcapsules cannot stabilize the foamed conditions, and it is difficult to cause the resin to have uniformly sized cells that are continuously formed in the expanded article. Another problem is the forming method is limited to pressing, when a vulcanized rubber material is used.

It is an object of the present invention to provide a foamable thermoplastic elastomer composition which can be formed into a stable foamed article incorporated with heat-expandable microcapsules, in consideration of the above problems. It is another object of the present invention to provide a method of producing the same.

SUMMARY OF THE INVENTION

The inventors of the present invention have found, after having extensively studied to solve the above problems, that a foamable thermoplastic elastomer composition which can be formed into stable foamed articles can be obtained by incorporating a thermoplastic resin with a resin composition containing an olefin-based resin having a specific melting or softening point, heat-expandable microcapsules which expand at 120 to 300° C. and the volatile composition. In particular, the inventors have found that the stable elastomer composition for foamed articles is obtained by kneading the composition in two stages at a specific temperature or lower, thereby achieving the present invention.

The first aspect of the invention is a foamable thermoplastic elastomer composition which contains:
- (a) 10 to 90 parts by weight of one of an olefin-based resin and rubber having a melting or softening point of 140° C. or lower;
- (b) 9 to 85 parts by weight of heat-expandable microcapsules expanding at 120 to 300° C.; and
- (c) 1 to 50 parts by weight of a volatile composition, wherein the components (a) to (c) total 100 parts by weight.

The second aspect of the invention is a foamable thermoplastic elastomer composition which contains:
- (a) 10 to 90 parts by weight of one of an olefin-based resin and rubber having a melting or softening point of 140° C. or lower;
- (b) 9 to 85 parts by weight of heat-expandable microcapsules expanding at 120 to 300° C.;
- (c) 1 to 50 parts by weight of a volatile composition; and
- (d) 50 to 99 parts by weight of a thermoplastic resin, wherein the components (a) to (d) total 100 parts by weight.

The third aspect of the invention is the foamable thermoplastic elastomer composition of the first or second aspect, wherein said volatile composition (c) has a boiling point of 90 to 250° C., or evaporates at (0.5 g/1000 cm$^2$)/hour or more at 100° C.

The fourth aspect of the invention is the foamable thermoplastic elastomer composition of the first or second aspect, wherein said volatile composition (c) is of at least one type selected from the group consisting of a hydrocarbon and oxygen-containing compound.

The fifth aspect of the invention is the foamable thermoplastic elastomer composition of the first or second aspect, wherein said volatile composition (c) is of at least one type selected from the group consisting of water and water-containing composition, and contained at 1 to 30 parts by weight per 100 parts by weight of the components (a) to (c) totaled.

The sixth aspect of the invention is a method of producing a foamable thermoplastic elastomer composition by kneading, at 140° C. or lower, (a) 10 to 90 parts by weight of one of an olefin-based resin and rubber having a melting or softening point of 140° C. or lower, (b) 9 to 85 parts by weight of heat-expandable microcapsules expanding at 120 to 300° C., and (c) 1 to 50 parts by weight of a volatile composition.

The seventh aspect of the invention is a method of producing a foamable thermoplastic elastomer composition, wherein the composition is produced in two stages, the first stage kneading, at 140° C. or lower, (a) 10 to 90 parts by weight of one of an olefin-based resin and rubber having a melting or softening point of 140° C. or lower, (b) 9 to 85 parts by weight of heat-expandable microcapsules expanding at 120 to 300° C., and (c) 1 to 50 parts by weight of a volatile composition, to produce the resin composition containing the components (a) to (c), and the second stage adding the resin composition containing the components (a) to (c) to (d) a thermoplastic resin, and kneading these components.

The eighth aspect of the invention is the method of the seventh aspect for producing a foamable thermoplastic elastomer composition, wherein the ratio of said resin composition containing the components (a) to (c)/thermoplastic resin (d) is any weight ratio from 1.0:99.0 to 50:50.

The ninth aspect of the invention is the method of the sixth or seventh aspect for producing a foamable thermoplastic elastomer composition, wherein said volatile composition (c) has a boiling point of 90 to 250° C., or evaporates at (0.5 g/1000 cm$^2$)/hour or more at 100° C.

The tenth aspect of the invention is the method of the sixth or seventh aspect for producing a foamable thermoplastic elastomer composition, wherein said volatile composition (c) is of at least one type selected from the group consisting of a hydrocarbon and oxygen-containing compound.

The 11$^{th}$ aspect of the invention is the method of the sixth or seventh aspect for producing a foamable thermoplastic elastomer composition, wherein said volatile composition (c) is of at least one type selected from the group consisting of water and water-containing composition, and contained at 1 to 30 parts by weight per 100 parts by weight of the components (a) to (c) totaled.

The 12$^{th}$ aspect of the invention is the method of the sixth or seventh aspect for producing a foamable thermoplastic elastomer composition, wherein a kneader is used for kneading the components.

DETAILED DESCRIPTION OF THE INVENTION

The foamable thermoplastic elastomer composition of the present invention is described in more detail with respect to its components, method of production and purposes.

1. Components of the Expandable Thermoplastic Elastomer Composition (1) Olefin-based Resin or Rubber Component (a)

The olefin-based resin or rubber component (a) for the present invention includes olefin-based copolymer rubber and amorphous polyolefin. The olefin-based resin or rubber has a melting or softening point of 140° C. or lower. The melting or softening point exceeding 140° C. may cause problems, e.g., undesirous expansion of the heat-expandable microcapsules or evaporation of the volatile composition during the kneading step, and decreased expansion ratio when incorporated in the component (d). The component (a) may be composed of one or more types of olefin-based resin or rubber.

The olefin-based copolymer rubber useaful for the component (a) includes an elastomer of copolymer of α-olefin, e.g., ethylene, propylene, 1-butene or 1-pentene, and olefin-based rubber of copolymer of an α-olefin and non-conjugated diene. The non-conjugated dienes useful for the present invention include dicyclopentadiene, 1,4-hexadiene, dicyclooctadiene, methylenenorbornene and 5-ethylidene-2-norbornene or the like.

More specifically, these olefin-based copolymer rubbers include ethylene/propylene, ethylene/propylene/non-conjugated diene, ethylene/1-butene, ethylene/1-butene/non-conjugated diene, and ethylene/propylene/1-butene copolymer rubbers or the like.

The amorphous polyolefin useful for the present invention is composed of an amorphous copolymer mainly comprising propylene and having a melt viscosity of 250 to 50,000 mPa·s at 190° C. preferably 10,000–25,000 mPa·s at 190° C. It is a polymer of relatively low molecular weight, having a crystallinity degree of 50% or less, determined by X-ray diffractometry, preferably 20% or less. It preferably has a glass transition temperature of −33 to −23° C., and softening point of 120 to 135° C.

More specifically, the amorphous polyolefins useful for the present invention include atactic polypropylene as an amorphous homopolymer, and propylene-based amorphous copolymers with another α-olefin (e.g., ethylene, 1-butene, 1-pentene, 1-hexene, 4-methyl-1-pentene, 1-octene or 1-decene). Of these amorphous polyolefins, atactic polypropylene amorphous homopolymer, propylene/ethylene amorphous copolymer and propylene/1-butene amorphous copolymers are preferable. These amorphous polyolefins may be random or block copolymers. In the case of the block copolymer, its propylene unit should be bonded to have the atactic structure. In the case of the copolymer of propylene and ethylene, the propylene unit content is preferably at least 50% by mol, more preferably 60 to 100% by mol.

Content of the component (a) is 10 to 90 parts by weight, preferably 15 to 70 parts by weight, more preferably 20 to 60 parts by weight, wherein the components (a) to (c) total 100 parts by weight. At a content below 10 parts by weight, the resin composition may have insufficient properties, e.g., strength, and be difficult to knead. Moreover, uniform dispersion or foaming may not be reliable. At above 90 parts by weight, on the other hand, the resin composition may not foam to the required extent, because of difficulty in effecting the sufficient expansion effect.

(2) Heat-expandable Microcapsule Component (b)

The heat-expandable microcapsule component (b) of the present invention has the effect of increasing volume and decreasing specific gravity by thermal expansion. It thermally expands at 120 to 300° C., preferably 140 to 260° C. When the thermal expansion temperature is below 120° C., the thermoplastic elastomer composition may undesirably expand under heating while being prepared, and have deteriorated resistance to heat. When it is above 300° C., on the other hand, the thermoplastic elastomer composition may not thermally expand in the forming or fabrication temperature range.

The heat-expandable microcapsule expanding at 120 to 300° C. should have an average particle size of 1 to 50 μm. If its average particle size is below 1 μm, it may not be sufficiently dispersed in the rubber. When it is above 50 μm, on the other hand, the formed article of the composition of the present invention will have greatly reduced strength. Its expansion ratio is preferably 10 to 100. At a ratio below 10, the microcapsule may not sufficiently expand. At a ratio above 100, on the other hand, uniformly fine cells may not be obtained. One example of the heat-expandable microcapsules is Expancel (supplied by Expancel Co.) with isobutane contained by the outer shell of vinylidene chloride/acrylonitrile copolymer.

Content of component (b) is 9 to 85 parts by weight, preferably 15 to 70 parts, more preferably 20 to 60 parts by weight, wherein the components (a) to (c) total 100 parts by weight. At a content below 9 parts by weight, the characteristics of the resin composition will be largely determined by those of the base resin, because of insufficient expansion effect. At above 85 parts by weight, on the other hand, the resin composition may not be well kneaded, causing reduced cell uniformity.

(3) Volatile Composition Component (c)

The volatile composition component (c) of the present invention causes the elastomer composition to foam. As a result, the composition is stably foamed due to the effect of the component (c) increasing the volume and decreasing the specific gravity of the composition. The volatile composition is composed of hydrocarbons, oxygen-containing compounds, water, water-containing composition or the like which has a boiling point of 90 to 250° C. or evaporates at (0.5 g/1000 cm$^2$)/hour or more at 100° C.

The volatile composition will excessively lose its volatiles by evaporation during the kneading step, when its boiling point is below 90° C. When it is above 250° C., on the other hand, the composition will no longer work as the foaming aid for the heat-expandable microcapsules as component (b), because the volatiles cannot evaporate sufficiently during the forming or fabrication step to bring about the effect of expanding the elastomer composition. Moreover, the volatile composition evaporating at below (0.5 g/1000 cm$^2$)/hour may no longer work as the foaming aid, because of insufficient foaming effect during the forming or fabrication step.

The evaporation rate at 100° C. may be determined by a halogen moisturemeter HG53 (METTLER-TOLEDO Co.). For example, an adequate quantity (20 g) of the sample solution, put in a drip tray (70 cm$^2$), is heated to 100° C. in around 60 seconds, at which it is held for a constant time (10 minutes) at constant intervals (1 minute), to determine water content by the following formula:

Water content=(Weight after the test−Weight before the test)×100/Weight before the test In the case of H$_2$O, for example, the evaporation rate is (99 g/1000 cm$^2$)/hour.

The specific examples of the volatile compositions having a boiling point of 90 to 250° C. include hydrocarbons, e.g., heptane, ligroin, methyl cyclohexane and non-aromatic-based oil having a specific gravity of 0.83 or less; and oxygen-containing compounds, such as alcohols (e.g., n-propyl alcohol, isobutyl alcohol and phenols), ethers (e.g., dioxane), fatty acids (e.g., acetic acid), fatty acid esters (e.g., sec-butyl acetate and ethyl propionate), ketones (e.g., acetal and methylisobutylketone), and diacid esters (dibutyl adipate, dibutyl sebacate, dimethyl acetylricinoleate and dibutyl acetylricinoleate).

The volatile compositions having an evaporation rate of (0.5 g/1000 cm$^2$)/hour or more at 100° C. include 2,2,4-trimethyl-1,3-pentanediol diisobutyrate and 1,5-dihydroxy pentane. These compositions are commercially available, e.g., "Neothiosol" (Sanko Chemical Industries Co.) and "TXIB" (Eastman Chemical Co.).

The water-containing compositions useful for the present invention include silica sol, where the negative-charged silica particles repel each other because the silanol groups on the silica particle surfaces are bound to the hydroxyl ions in an alkaline condition, to be stably present without being bound to each other. Sodium or ammonium hydroxide is used as the alkalization agent. The silica particles are amorphous, highly dense and pure, and spherical, having a density of 2.1 to 2.2 g/cm$^3$ and particle size of 10 to 20 μm. When dried, silica sol has hydroxyl group on the surface dehydrated to release water. These silica sols are commercially available, e.g., "Adelite AT" (Asahi Denka Kogyo Co.).

The content of component (c) is 1 to 50 parts by weight, preferably 5 to 20 parts by weight, more preferably 10 to 15 parts by weight, wherein the components (a) to (c) total 100 parts by weight. When the component (c) is of at least one type selected from the group consisting of water and water-containing composition, the content is 1 to 30 parts by weight, preferably 5 to 20 parts by weight, more preferably 10 to 15 parts by weight. At a content of component (c) below 1 part by weight, the resin composition may have the effect of insufficient expansion, and its characteristics will be essentially determined by those of Expancel. At above 50 parts by weight, on the other hand, the resin composition may not be kneaded well and thereby lose cell uniformity. At a concentration of the component (c) above 30 parts by weight, when it is of at least one type selected from the group consisting of water and water-containing Composition, the resin composition may not be kneaded well and thereby lose cell uniformity.

(4) Thermoplastic Resin Component (d)

The thermoplastic resins useful as component (d) of the present invention include polyolefin-based resins (e.g., polypropylene, propylene/ethylene copolymer, propylene/butene copolymer, polyethylene, ethylene/vinyl acetate copolymer, ethylene/acrylate copolymer, ethylene/acrylic acid copolymer, and ionomer), cyclic hydrocarbon-based resins (e.g., cyclic olefin copolymer), polystyrene-based resins (e.g., polystyrene resin, acrylonitrile/styrene copolymer (AS resin), acrylonitrile/butadiene/styrene copolymer (ABS resin), methacrylate/styrene copolymer (MS resin), methacrylate/butadiene/styrene copolymer (MBS resin), styrene/maleic anhydride copolymer (SMA resin), styrene/conjugated diene copolymer, and hydrogenated compounds of these copolymers (SBS, SIS, SEBS, SEPS and SBBS)), styrene-based elastomer compositions (e.g., compositions composed of at least one type selected from the group consisting of styrene/conjugated diene copolymer and hydrogenated compound thereof, non-aromatic-based softening agent for rubber, and polyolefin-based resin), polyamide-based resins (e.g., polyamide and polyamide-based elastomer), polyester-based resins (e.g., polyester and polyester-based elastomer), polyurethane-based resins (e.g., polyurethane and polyurethane-based elastomer), polyvinyl-based resins, and polycarbonate-based resins. Of these, olefin- and styrene-based resins are more preferable, and styrene-based elastomer compositions are still more preferable.

The content of the component (d) is 50 to 99 parts by weight, wherein the components (a) to (d) total 100 parts by weight. In other words, the ratio of the resin composition containing the components (a) to (c) to the thermoplastic resin (d) is any weight ratio from 1.0:99.0 to 50:50, preferably 3:97 to 35:65, more preferably 5:95 to 30:70.

(5) Other Components

The foamable thermoplastic elastomer composition of the present invention may be incorporated with other optional components, as desired, within limits not adverse to the object of the present invention. These optional components include a plasticizer, softening agent, inorganic filler, blocking inhibitor, sealing improver, heat stabilizer, antioxidant, light stabilizer, ultraviolet ray absorber, lubricant, nucleating agent and colorant or the like.

The antioxidants useful for the present invention include phenol-based ones, e.g., 2,6-di-tert-p-butyl-p-cresol, 2,6-di-tert-butyl phenol, 2,4-dimethyl-6-tert-butyl phenol, 4,4-dihydroxydiphenyl and tris(2-methyl-4-hydroxy-5-tert-butylphenyl)butane; phosphate-based ones; and thioether-based ones. Of these, phenol- and phosphate-based ones are particularly preferable.

The plasticizers and softening agents useful for the present invention include phthalate ester-based plasticizers, aromatic carboxylate-based plasticizers, aliphatic dibasic acid ester-based plasticizers, phosphate ester-based plasticizers, polyester-based plasticizers, epoxy-based plasticizers, and non-aromatic-based softening agents for rubber. They may be used either individually or in combination. More specifically, these plasticizers include di-normal butyl phthalate (DBP), di-2-ethylhexyl phthalate (DOP), diisooctyl phthalate (DIOP), diisononyl phthalate (DINP), diisodecyl phthalate (DIDP), diisobutyl adipate (DIBA), di-2-ethylhexyl adipate (DOA), diisooctyl adipate (DIOA), diisodecyl adipate (DIDA), di-normal butyl sebacate (DBS), dialphanol sebacate (DAS), di-secondary butyl azelate (DOZ), di-isooctyl azelate (DIOZ), tri-2-ethylhexyl phosphate (TOP), tricresyl phosphate (TCP) and trixylenyl phosphate (TXP) or the like. The non-aromatic-based softening agent for rubber is a non-aromatic-based mineral oil, or liquid or low-molecular-weight synthetic agent. The softening agents of mineral oil for rubber are generally a mixture of an aromatic ring, naphthenic ring and paraffin chain. They are distinguished from each other by the paraffin-, naphthene- and aromatic-based ones, when carbons in the paraffin chains account for 50% or more of the total carbons, those in the naphthene rings for 30 to 40%, and the aromatic ones for 30% or more, respectively. The paraffin- and naphthene-based ones, defined above, are preferable for the mineral oil-based softening agent for rubber as the optional component for the present invention, and paraffin-based one is more preferable. Moreover, the paraffin-based one having a lower aromatic ring content is more preferable. The non-aromatic-based softening agent for rubber preferably has a kinematic viscosity of 20 to 500 cst at 37.8° C., pour point of −10 to −15° C., and flash point (COC) of 170 to 300° C.

2. Method of Producing the Expandable Thermoplastic Elastomer Composition

The foamable thermoplastic elastomer composition of the present invention can be produced by kneading the above-described components of the specified content by a kneading machine, e.g., roll, kneader, Banbury mixer, single-screw extruder, twin-screw extruder or multi-screw extruder. A kneader and Banbury mixer are preferable, and a combination of kneader and extruder is more preferable. It is preferable to continuously extrude the starting mixture supplied batchwise.

The foamable thermoplastic elastomer composition of the present invention is produced in two stages: the first stage involves kneading the components (a) to (c) at a specified content to obtain the resin composition, and the second stage involves adding the resin composition prepared in the first stage to the component (d) of specified content.

The methods of kneading components (a) to (c) at a specified content in the first stage include the followings: p1 (i) blending the components (a) to (c) in a lump and kneading the mixture by a kneading machine also in a lump, (ii) melting the component (a), to which the components (b) and (c) are added, and kneading these components, and (iii) mixing the component (a) with the component (c) and then with the component (b), and kneading these components.

Of these methods, the methods (i) and (ii) are more preferable. The melting/kneading temperature is 140° C. or lower, preferably 120° C. or lower. At above 140° C., the heat-expandable microcapsules as the component (b) partially expand to release some of the volatiles into the air, decreasing the expansion ratio when incorporated in a thermoplastic resin as the component (d). The method (i) or (ii) gives the thermoplastic elastomer composition excellent in thermal expansion, because of reduced exposure of the heat-expandable microcapsules as the component (b) and volatile composition as the component (c) to heat.

The foamable thermoplastic elastomer composition of the present invention, being excellent in thermal expansion and formability/fabricability, can be expanded into a stable thermoplastic elastomer. It is more stable in closed cell structure, more uniform in cell size, and at least 2 times higher in expansion ratio than the one prepared by individually applied water-aided, chemical or thermal expansion.

Therefore, the foam of the foamable thermoplastic elastomer composition of the present invention is excellent in that it is light, and it is also excellent in its vibration-damping, vibration-insulating, sound-insulating and elasticity-recovering properties, and, as such, is suitable, for example, as various types of sealants, and vibration-damping and vibration-insulating parts for various areas, e.g., automobiles, home electric appliances, construction and IT-related industries.

EXAMPLES

The present invention is described in more detail by EXAMPLES and COMPARATIVE EXAMPLES, which by no means limit the present invention. The evaluation methods used in EXAMPLES and COMPARATIVE EXAMPLES are described below.

1. Methods of Evaluation
(1) Compound productivity
(1-1) Kneadability: A given quantity of the composition was put in a 20 L kneader in a lump and kneaded for 6 minutes to observe the kneaded conditions, which were evaluated according to the following standards:
  ○: The composition is well dispersed.
  ×: The composition is not well dispersed, partly solidified.
(1-2) Releasability from the kneader: The kneaded composition was released from the 20 L kneader to observe the releasing conditions, which were evaluated according to the following standards:
  ○: The composition is easily released.
  ×: The composition is not easily released.
(1-3) Pelletizability: The kneaded composition was put in an 80 mm single-screw extruder, and the composition extruded from the die was cut by a rotary cutter. Pelletizability of the composition was evaluated according to the following standards:
  ○: The pellets can be produced without any trouble.
  ×: The composition partly remains uncut, and debris is produced.
(1-4) Pellet shape: Shape of the pellets produced was observed, and evaluated according to the following standards:
  ○: The dense pellets of the same shape are produced.
  ×: The pellets have uneven shape, and are expanded to some extent.
(2) Product
(2-1) Conditions of the formed article: The formed article of the expanded composition was observed, and evaluated according to the following standards:
  ○: The formed article has flat and smooth surfaces, and uniform and closed cells.
  ×: The formed article has rough surfaces, and uneven or continuous foams.
(2-2) Expansion ratio: Expansion ratio was determined in accordance with JIS K-7112. The expanded composition was judged to be good, when expanded approximately 2 times or more.
2. Samples Used
(1) Olefin-based resin component
(a-1): Amorphous propylene/ethylene copolymer (APE); Eastoflex E-1200 (Eastman Chemical Co.), kinematic viscosity: 2000 mPa·s (190° C.), softening point: 135° C., glass transition temperature: −28° C.
(a-2): Ethylene/butene copolymer (EBR); Esprene NO441 (Sumitomo Chemical Co.), butene content: 30%, MFR: 1.3 g/10 minutes (190° C.)

(2) heat-expandable microcapsule component (b): Expancel 098DUX120 (Expancel Co.), particle size: 3 to 50 μm, temperature at which expansion starts: 155 to 160° C., temperature at which expansion ends: 265 to 270° C.
(3) Volatile, thermal expansion aid component (c-1); TXIB (Eastman Chemical Co.), specific gravity: 0.942 to 0.948, molecular weight: 286.4, evaporation rate at 100° C.: (0.5 g/1000 cm$^2$)/hour
(4) Colloidal silica component (c-2); Adelite AT-20Q (Asahi Denka Kogyo), SiO$_2$ content: 20 to 21% pH (25° C.): 2.5 to 4.5, particle size: 10 to 20 μm, specific gravity: 1.12 to 1.14
(5) Styrene-based thermoplastic elastomer (d):Actymer AJ-1050S (RIKEN TECHNOS CORP.), MFR: 2.3 g/10 minutes, specific gravity: 0.94, hardness: 50A
(6) Hindered phenol/phosphate/lactone-based composite antioxidant component (e): HP2215 (Ciba Speciality Chemicals Co.)

EXAMPLES 1 AND 2, AND COMPARATIVE EXAMPLES 1 TO 6

The components (a-1), (a-2), (b) and (c-1) were kneaded in a 20 L pressurized kneader for 6 minutes until vapor pressure and temperature increased to 3.0 kgG/cm$^2$ and 110° C., respectively. The composition in each of EXAMPLES and COMPARATIVE EXAMPLES is given in Table 1. Each kneaded composition was pelletized by a single-screw extruder equipped with a rotary cutter at the end and having an L/D ratio of 20 under the conditions of 50° C. as the kneading temperature and 80 rpm as the screw rotational speed. The composition of 20 parts by weight of the pellets dry-blended with 80 parts by weight of the styrene-based elastomer as the component (d) was formed into the 130 by 130 by 2 mm plate by an injection molder under the following conditions.

Forming temperature: 220° C.
Mold temperature: 30° C.
Injection speed: 15 mm/second
Injection pressure: 800 kg/cm$^2$
Dwelling pressure: 200 kg/cm$^2$
Injection time: 5 seconds
Cooling time: 20 seconds As shown in Table 1, each of the foamable thermoplastic elastomer compositions of the present invention, prepared in EXAMPLES 1 and 2, showed good properties. Each of those prepared in COMPARATIVE EXAMPLES 1 and 2 contained the components (a-1) and (a-2), each at a content out of the range for the present invention. The composition had insufficient pelletizability and incoherent compound conditions, and gave the formed article deteriorated outer appearances, when the components (a-1) and (a-2) were contained each at a content below the range for the present invention. When the components (a-1) and (a-2) were contained each at a content above the range for the present invention, on the other hand, the formed article had an insufficient expansion ratio. Each of those prepared in COMPARATIVE EXAMPLES 3 and 4 contained the component (b) at a content out of the range for the present invention. The formed article had an insufficient expansion ratio when the component (b) was contained at a content below the range for the present invention, and was unevenly expanded when it was contained at a content above the range. Each of those prepared in COMPARATIVE EXAMPLES 5 and 6 contained the component (c-1) at a content out of the range. The formed article had an insufficient expansion ratio when the component (c-1) was contained at a content below the range, and deteriorated surfaces resulting from excessive evaporation of the volatiles when it was contained at a content above the range.

EXAMPLES 3 AND 4, AND COMPARATIVE EXAMPLE 7 TO 12

The sample was prepared in each of EXAMPLES 3 and 4, and COMPARATIVE EXAMPLES 7 to 12 in the same manner as in EXAMPLE 1, except the components (a-1), (a-2), (b) and (c-2) were used at contents given in Table 2, and tested also in the same manner. The evaluation results are given in Table 2.

TABLE 1

|  |  | EXAMPLES | | COMPARATIVE EXAMPLES | | | | | |
| --- | --- | --- | --- | --- | --- | --- | --- | --- | --- |
|  |  | 1 | 2 | 1 | 2 | 3 | 4 | 5 | 6 |
| Compositions of the components (a) to (c) | Components (a-1)(parts by weight) | 45 | 18 | 5 | 72 | 65 | 3 | 52 | 25 |
|  | Components (a-2)(parts by weight) | 12 | 9 | 2 | 20 | 17 | 2 | 15 | 7 |
|  | Components (b)(parts by weight) | 30 | 60 | 80 | 6 | 5 | 92 | 33 | 16 |
|  | Components (c-1)(parts by weight) | 13 | 13 | 13 | 2 | 13 | 3 | 0 | 52 |
|  | Components (e)(parts by weight) | 0.3 | 0.3 | 0.3 | 0.3 | 0.3 | 0.3 | 0.3 | 0.3 |
| Productivity of the compositions of (a) to (c) | Kneadability | ○ | ○ | ○ | ○ | ○ | ○ | ○ | x |
|  | Releasability from the kneader | ○ | ○ | ○ | ○ | ○ | ○ | ○ | ○ |
|  | Pelletizability | ○ | ○ | x | ○ | ○ | x | ○ | x |
|  | Pellet shape | ○ | ○ | x | ○ | ○ | x | ○ | x |
| Total of the components (a) to (c) (parts by weight) |  | 20 | 20 | 20 | 20 | 20 | 20 | 20 | 20 |
| Components (d)(parts by weight) |  | 80 | 80 | 80 | 80 | 80 | 80 | 80 | 80 |
| Evaluation of the formed articles | Conditions of the formed articles | ○ | ○ | x | x | x | x | x | x |
|  | Expansion ratio (ratio) | 2.51 | 2.72 | 1.52 | 1.11 | 1.11 | 1.54 | 1.32 | 1.85 |

TABLE 2

|  |  | EXAMPLES | | COMPARATIVE EXAMPLES | | | | | |
|---|---|---|---|---|---|---|---|---|---|
|  |  | 3 | 4 | 7 | 8 | 9 | 10 | 11 | 12 |
| Compositions of the components (a) to (c) | Components (a-1)(parts by weight) | 45 | 18 | 5 | 72 | 65 | 3 | 52 | 35 |
|  | Components (a-2)(parts by weight) | 12 | 9 | 2 | 20 | 17 | 2 | 15 | 9 |
|  | Components (b)(parts by weight) | 30 | 60 | 80 | 6 | 5 | 92 | 33 | 24 |
|  | Components (c-2)(parts by weight) | 13 | 13 | 13 | 2 | 13 | 3 | 0 | 32 |
|  | Components (e)(parts by weight) | 0.3 | 0.3 | 0.3 | 0.3 | 0.3 | 0.3 | 0.3 | 0.3 |
| Productivity of the compositions of (a) to (c) | Kneadability | o | o | o | o | o | o | o | x |
|  | Releasability from the kneader | o | o | o | o | o | o | o | o |
|  | Pelletizability | o | o | x | o | o | x | o | x |
|  | Pellet shape | o | o | x | o | o | x | o | x |
| Total of the components (a) to (c) (parts by weight) |  | 20 | 20 | 20 | 20 | 20 | 20 | 20 | 20 |
| Components (d)(parts by weight) |  | 80 | 80 | 80 | 80 | 80 | 80 | 80 | 80 |
| Evaluation of the formed articles | Conditions of the formed articles | o | o | x | x | x | x | x | x |
|  | Expansion ratio (ratio) | 2.08 | 2.42 | 1.32 | 1.01 | 1.01 | 1.34 | 1.25 | 1.96 |

As shown in Table 2, each of the foamable thermoplastic elastomer compositions of the present invention, prepared in EXAMPLES 3 and 4, showed good properties. Each of those prepared in COMPARATIVE EXAMPLES 7 and 8 contained the components (a-1) and (a-2), each at a content out of the range for the present invention. The composition had insufficient pelletizability and incoherent compound conditions, and gave the formed article deteriorated outer appearances, when the components (a-1) and (a-2) were contained each at a content below the range for the present invention. When the components (a-1) and (a-2) were contained each at a content above the range for the present invention, on the other hand, the formed article had an insufficient expansion ratio. Each of those prepared in COMPARATIVE EXAMPLES 9 and 10 contained the component (b) at a content out of the range for the present invention. The formed article had an insufficient expansion ratio when the component (b) was contained at a content below the range for the present invention, and was unevenly expanded when it was contained at a content above the range. Each of those prepared in COMPARATIVE EXAMPLES 11 and 12 contained the component (c-2) at a content out of the range. The formed article had an insufficient expansion ratio when the component (c-2) was contained at a content below the range, and deteriorated surfaces resulting from excessive generation of steam when it was contained at a content above the range.

The foamable thermoplastic elastomer composition of the present invention is the resin composition produced by the multi-stage process to contain the heat-expandable microcapsules.

Therefore, it can continuously produce a stable foam having uniformly sized cells and expansion, which is excellent in that it is light, and it is also excellent in its vibration-damping, vibration-insulating, sound-insulating and elasticity-recovering properties, and, as such, is suitable for, e.g., various types of sealants, and vibration-damping and vibration-insulating parts for various areas, e.g., automobiles, home electric appliances, construction and IT-related industries.

What is claimed is:

1. A foamable thermoplastic elastomer composition comprising:
   (a) 10 to 90 parts by weight of one of an olefin-based resin and rubber having a melting or softening point of 140° C. or lower;
   (b) 9 to 85 parts by weight of heat-expandable microcapsules expanding at 120 to 300° C.; and
   (c) 1 to 50 parts by weight of a volatile composition,
   wherein the components (a) to (c) total 100 parts by weight.

2. A foamable thermoplastic elastomer composition comprising:
   (a) 10 to 90 parts by weight of one of an olefin-based resin and rubber having a melting or softening point of 140° C. or lower;
   (b) 9 to 85 parts by weight of heat-expandable microcapsules expanding at 120 to 300° C.;
   (c) 1 to 50 parts by weight of a volatile composition; and
   (d) 50 to 99 parts by weight of a thermoplastic resin,
   wherein the components (a) to (d) total 100 parts by weight.

3. The foamable thermoplastic elastomer composition according to claim 1 or 2, wherein said volatile composition (c) has a boiling point of 90 to 250° C., or is evaporated at (0.5 g/1000 cm$^2$)/hour or more at 100° C.

4. The foamable thermoplastic elastomer composition according to claim 1 or 2, wherein said volatile composition (c) is of at least one type selected from the group consisting of a hydrocarbon and oxygen-containing compound.

5. The foamable thermoplastic elastomer composition according to claim 1 or 2, wherein said volatile composition (c) is of at least one type selected from the group consisting of water and water-containing composition, and contained at 1 to 30 parts by weight per 100 parts by weight of the components (a) to (c) totaled.

6. A method of producing a foamable thermoplastic elastomer composition, comprising the step of:
   kneading, at 140° C. or lower, (a) 10 to 90 parts by weight of one of an olefin-based resin and rubber having a melting or softening point of 140° C. or lower, (b) 9 to 85 parts by weight of heat-expandable microcapsules expanding at 120 to 300° C., and (c) 1 to 50 parts by weight of a volatile composition.

7. A method of producing a foamable thermoplastic elastomer composition, comprising the steps of
   kneading, at 140° C. or lower, (a) 10 to 90 parts by weight of one of an olefin-based resin and rubber having a melting or softening point of 140° C. or lower, (b) 9 to 85 parts by weight of heat-expandable microcapsules expanding at 120 to 300° C., and (c) 1 to 50 parts by weight of a volatile composition, to produce the resin composition containing the components (a) to (c), adding the resin composition containing the components (a) to (c) to (d) a thermoplastic resin, and kneading these components.

8. The method of producing a foamable thermoplastic elastomer composition according to claim 7, wherein the ratio of said resin composition containing the components (a) to (c)/thermoplastic resin (d) is weight ratios 1.0:99.0 to 50:50.

9. The method of producing a foamable thermoplastic elastomer composition according to claim 6 or 7, wherein said volatile composition (c) has a boiling point of 90 to 250° C., or is evaporated at (0.5 g/1000 cm$^2$)/hour or more at 100° C.

10. The method of producing a foamable thermoplastic elastomer composition according to claim 6 or 7, wherein said volatile composition (c) is of at least one type selected from the group consisting of a hydrocarbon and oxygen-containing compound.

11. The method of producing a foamable thermoplastic elastomer composition according to claim 6 or 7, wherein said volatile composition (c) is of at least one type selected from the group consisting of water and water-containing composition, and contained at 1 to 30 parts by weight per 100 parts by weight of the components (a) to (c) totaled.

12. The method of producing a foamable thermoplastic elastomer composition according to claim 6 or 7, wherein a kneader is used for kneading the components.

\* \* \* \* \*